3,264,629
CABLE SIGNAL DEVICE
Franklin L. Le Bus, Sr., Geneva, Switzerland, assignor to Le Bus Royalty Company, Longview, Tex., a partnership
Filed Nov. 6, 1963, Ser. No. 321,900
3 Claims. (Cl. 340—259)

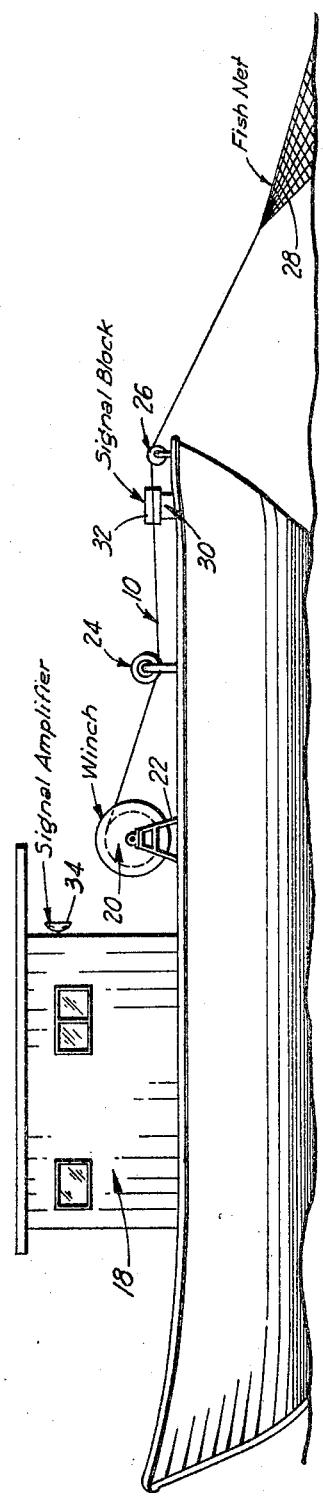

This invention relates to signaling devices and more particularly, but not by way of limitation, to a signaling means for indicating the length of a cable, or the like, which has been spooled or unreeled in a cable winding operation.

There are many cable spooling operations wherein it is considered desirable to indicate or determine the length of the cable that has been either spooled or unspooled from the cable drum. For example, in well bore drilling or servicing operations, it is frequently important to be able to determine the distance below the earth surface at which some particular operation is to be conducted or to determine at what depth within the well bore a certain condition exists. Another example wherein it is advantageous to know the length of a line or cable which has been unspooled is in the commercial fishing industry wherein it is frequently of great advantage to be able to readily ascertain the distance through which the fish net, or the like, has been let out from the fishing boat. Of course, in substantially any type of hoisting operation such as mining operations, airplane antenna units, and the like, it is frequently desirable to readily determine the lengths of cable being reeled or unreeled.

There are a plurality of flagging systems in use today for providing a visual determination of a length of cable. In some instances, markers in the nature of small flags may be secured to a line at predetermined intervals therealong in order to indicate a given length or distance along the line. These markers may be numbered or color coded, or the like, and as a marker passes a known position the length of the line may be visually ascertained. In other cable flagging devices, bundles of horse hair, or the like, may be inserted through the cable or attached thereto at predetermined spacings, but here again only a visual determination of unreeled or reeled lengths of cable is provided.

The present invention contemplates a novel cable signaling means wherein an audible signal is provided for indicating given lengths of cable being spooled or unspooled in a cable winding operation. A marker which may be a magnetic member, radioactive substance, or the like, is inserted within or wrapped around the cable at predetermined intervals in accordance with the desired dimensional information. As the cable is unspooled the marker is passed across or in the proximity of a suitable signal block or signal head device of a type which is sensitive to the substance of the marker. Each time a marker or indicator member secured to the cable passes the signal block a suitable electrical circuit is energized for ringing a bell, sounding a buzzer, or activating any suitable signaling device or signal amplifier. It will be apparent that the signal means may be a flashing light in lieu of an auditory device, but a flashing light will attract the attention of operating personnel for facilitating the measurement indications rather than a constant visual attendance as required with the use of cable flag members. Thus, audible indication is automatically provided upon the letting out or taking in of a given length of line during a cable winding or unwinding operation for readily indicating the length of the cable which has passed across the signal block. By way of example, magnetic members may be inserted in the cable at fifty foot intervals therealong whereby the audible or flashing signaling device will be activated upon the reeling or unreeling of every fifty foot length of the cable. It will be readily apparent that substantially any spacing may be provided between the signal members carried by the cable in accordance with the desired increments of measurement. In addition, a plurality of differing signals may be provided for the cable winding operation whereby the first measured length of cable will produce one given signal, the next measured length will provide a second distinctive signal, and so forth. In other words, upon the unspooling of the first measured length of cable, a buzzer, or the like, may be sounded once; upon the passage of the second measured length of cable, the buzzer may be sounded twice; thus, facilitating the determination of the overall length of measured cable which has been unspooled.

It is an important object of this invention to provide a novel means for readily indicating the length of a cable which has been spooled or unspooled in substantially any cable spooling operation.

It is another object of this invention to provide a novel means utilizing an audible signaling device for automatically indicating predetermined lengths of spooled or unspooled cable in a cable winding operation.

Still another object of this invention is to provide a novel cable signaling device wherein markers are carried by the cable itself for automatically activating a signaling system during a cable winding or unwinding operation to provide increments of measurement of cable length during the spooling operation.

A further object of this invention is to provide a cable signaling device wherein measured lengths of cable being spooled or unspooled may be readily determined simply and efficiently.

Other objects and advantages of the invention will be evident from the following detailed description, read in conjunction with the accompanying drawings, which illustrate my invention.

In the drawings:

FIGURE 1 is a side elevational view of a fishing boat having a fish net carried by a cable signaling device embodying the invention.

FIGURE 2 is a broken elevational view of a cable embodying the invention.

FIGURE 3 is a view similar to FIGURE 2 showing one modification of the invention.

Referring to the drawings in detail, reference character 10 generally indicates a cable, wire rope, line, or the like, such as may be utilized in substantially any cable winding or hoisting operation. The cable 10, as shown herein, normally consists of a plurality of strands, such as indicated at 12, interwoven or wound tightly together to provide a cable of substantially any desired length. A plurality of markers 14 are spaced along the cable 10 in accordance with predetermined dimensional intervals. Each marker 14 will produce a signal upon winding or unwinding of the cable to indicate the length of cable which has been spooled, as will be hereinafter set forth.

As depicted in FIGURE 2, the marker 14 may comprise a magnetic wire 16 wound securely around the outer periphery of the cable 10 and retained in position thereon in any suitable manner (not shown), but is not limited thereto. The marker 14 may comprise a magnetic member (not shown) embedded within the cable 10, if desired. In this embodiment, it may be desirable to slightly separate certain of the cable strands 12 in any well known manner whereby the magnetic element may be inserted between the strands and when the strands are tightened to the initial position, the pressure thereof will retain the magnetic element securely within the cable. It is to be further noted that the marker 14 may be constructed from a radioactive substance, or the like, in lieu of any type of magnetic member to produce substantially the same results in operation.

Referring now to FIGURE 3, a length of the cable 10 is shown with two successive markers 14 and 14a shown thereon. The marker 14 may be spaced from the marker 14a at any desired distance interval for a purpose as will be hereinafter set forth. The marker 14a is of a generally similar construction as the marker 14, but may be of a different overall length. Thus, the signal produced by the marker 14 will be of a slightly different time duration or otherwise ascertainable from the signal produced by the marker 14a. Instead of providing successive markers of varying lengths, as shown in FIGURE 3, it may be desirable to provide varying numbers of closely associated markers at the successive spaced intervals along the cable. This arrangement will provide varying signals as each successive length of cable is spooled thereby readily identifying the overall length of the spooled cable.

*Operation*

By way of illustration, FIGURE 1 depicts a fishing boat 18 of any suitable type, such as may be utilized in the commercial fishing industry. A cable spooling drum or hoisting winch 20 may be journalled rotatably on a suitable frame work 22 carried by the boat 18 for storing the cable 10 thereon. The cable 10 may be wound and unwound from the cable spooling drum 20 in any well known manner (not shown) and is preferably directed through a suitable fleet angle control device 24 which is widely utilized today in cable winding or hoisting operations to facilitate the spooling and unspooling of the cable from the drum 20. The cable preferably passes from the fleet angle control device 24 to a stationary sheave 26 and is directed thereover to a fish net 28. The fish net may be let out or brought in by the spooling or unspooling of the cable 10, as is well known.

A suitable signal block, generally indicated at 30, may be mounted on the boat 18 in any well known manner (not shown) for supporting a detector or signal head 32 which is disposed in the proximity of the pulley or sheave 26. The cable 10 being spooled or unspooled from the cable drum 20 passes in the vicinity or proximity of the head 32, as clearly shown in the drawings. The sound head 32 may be of any well known type and is suitably electrically connected with a signaling device or signal amplifier 34 which may be of any desired type, such as a buzzer, a bell, a horn, a flashing light, or the like. The sound head 32 is particularly designed and constructed for activation by the markers 14 and 14a. At any time one of the markers passes by the head 32, energization of the signal device 34 is provided, thus, activating the signaling device for indicating the length of the cable 10 that has been spooled or unspooled.

Each time a marker 14 passes by the head 32 during the cable winding or unwinding operation, the alarm or signal 34 is sounded thereby giving an automatic indication of the unreeling or unspooling of a given length of cable. As hereinbefore set forth, each successive predetermined length of cable may be provided with a marker of variable length. In this manner, the unspooling of the first given length of cable will provide a relatively short signal by the device 34. The passage of the next succeeding mark across the head 32 will provide a signal of a slightly longer time duration. Each of the succeeding markers may be of sequentially varying length to provide increasing time duration in order to facilitate the determination of the exact length of cable which has moved across the head 32.

Alternatively, it may be desired to utilize markers of the same length to provide signals of the same time duration in each instance and instead of increasing the length of the signal upon successive markers passing along the head 32, it may be desired to use varying numbers of the markers 14 to indicate passage of successive lengths of cable. For example, the first given length of cable may be indicated by a single marker 14 whereby a single signal is emitted from the device 34. The next succeeding length of cable may be provided with a pair of closely associated markers 14 whereby two successive signals are produced by the device 34. Each succeeding length of cable may be provided with a sequentially increasing number of the markers 14 whereby the overall length of the cable having passed across the sound head 32 may be quickly ascertained without maintaining a constant vigilance or manual attendance of the cable hoisting apparatus.

It is to be understood that the markers 14 may be utilized in conjunction with substantially any type of cable and in substantially any cable spooling or hoisting operation. The markers in combination with the signaling means may be utilized in well bore drilling or well bore servicing operations, in mine hoisting operations, in conjunction with aircraft operations of many types, and the like.

From the foregoing, it will be apparent that the present invention provides a novel method and means for automatically indicating the length of a line or cable which has been spooled or unspooled in substantially any cable winding operation. The markers interposed throughout the length of the cable may be magnetic, of a radioactive substance, or the like, and may be either secured around the outer periphery of the cable or embedded within the cable. The markers may be spaced at known or predetermined positions along the cable for activating the signaling device upon the passage of a given length of cable across the sound head member. This automatically provides a signal upon the spooling or unspooling of each given length of cable for readily ascertaining the total length of the cable which has been spooled or unspooled from the cable winding drum. The novel signaling method and means is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. A cable signaling device comprising a cable carried by a spooling drum, a plurality of markers interposed throughout the length of the cable at spaced intervals of known dimensions therealong, a detecting device, means for moving the cable and markers in the proximity of the detecting device during a cable spooling or unspooling operation whereby the passage of each marker across the detecting device is independently detected, each successive marker being of a length along the cable which is different from the length of any other of said marker means to produce a differing output duration to facilitate the determination of the overall length of the cable which has been spooled or unspooled, and signal means operably connected to said detecting device to produce a signal in response to each of the differing outputs detected wherein the signal is of substantially the same duration as the detected output.

2. A cable signaling device comprising a cable carried by a spooling drum, a plurality of distinctive markers interposed throughout the length of the cable at spaced intervals of known dimensions, a detecting device, means for moving the cable and markers in the proximity of the detecting device during the spooling or unspooling of the cable whereby the passage of each distinctive marker is detected for producing an output of a differing duration for each marker which is distinctive from the output duration of every other marker, and signal means operably connected to said detecting device for producing a signal of substantially the same duration as each of the detected outputs wherein each signal is distinctive from every other signal to facilitate the determination of the overall length of the cable which has been spooled or unspooled.

3. A cable signaling device for determining the length of a cable which has been spooled or unspooled in a cable spooling operation which comprises a plurality of markers interposed throughout the length of the cable at spaced intervals of known dimensions, a detector, signal means operably connected with the detector, means for moving the cable and markers in the proximity of the detector during a spooling or unspooling operation, each of said markers having a length along the length of the cable different duration than the output of every other marker, said detector being operable to detect the entire passage of each marker whereby the output of each marker is of different duration than the output of every other marker, and said signal means responsive to each detected output to produce a signal for substantially the same duration as the detected output to facilitate the determination of the overalll ength of the cable which has been spooled or unspooled.

References Cited by the Examiner

UNITED STATES PATENTS

| | | | |
|---|---|---|---|
| 230,743 | 8/1880 | Chase | 33—139 |
| 1,555,803 | 9/1925 | Huber | 324—10 |
| 2,480,490 | 8/1949 | Mark. | |
| 3,052,878 | 9/1962 | Berry | 340—282 |

NEIL C. READ, *Primary Examiner.*

R. M. GOLDMAN, *Assistant Examiner.*